US006981287B1

United States Patent
Chen

(10) Patent No.: US 6,981,287 B1
(45) Date of Patent: Jan. 3, 2006

(54) INFLATABLE BED UNIT

(75) Inventor: Yuan-Chen Chen, 8F-1, No.102, Sec.2, Roosevelt Rd., Taipei (TW)

(73) Assignee: Yuan-Chen Chen, (TW)

( * ) Notice: Subject to any disclaimer, the term of this patent is extended or adjusted under 35 U.S.C. 154(b) by 23 days.

(21) Appl. No.: 10/866,765

(22) Filed: Jun. 15, 2004

(51) Int. Cl.
*A47C 27/10* (2006.01)
(52) U.S. Cl. .................. 5/634; 5/710; 5/713; 5/733
(58) Field of Classification Search .............. 5/615, 5/632–634, 644, 710, 713, 715, 731, 733, 5/900.5
See application file for complete search history.

*Primary Examiner*—Michael Trettel
(74) *Attorney, Agent, or Firm*—Pearl Cohen Zedek Laizer, LLP

(57) ABSTRACT

An inflatable bed unit includes an inflatable primary bed that has a main part, a head part connected to and in fluid communication with the main part and pivotable relative to the main part, a pillow part connected to the head part such that the head part is raised by the pillow part and is pivoted relative to the main part when the pillow part expands upon injection of air therein, and a check valve interconnecting the pillow part and the head part and defining a valve opening that is opened to permit air flow from the pillow part to the head part when the pressure in the pillow part is greater than that in the head part, and that is closed to prevent air flow from the head part to the pillow part when the pressure in the head part is greater than that in the pillow part.

5 Claims, 5 Drawing Sheets

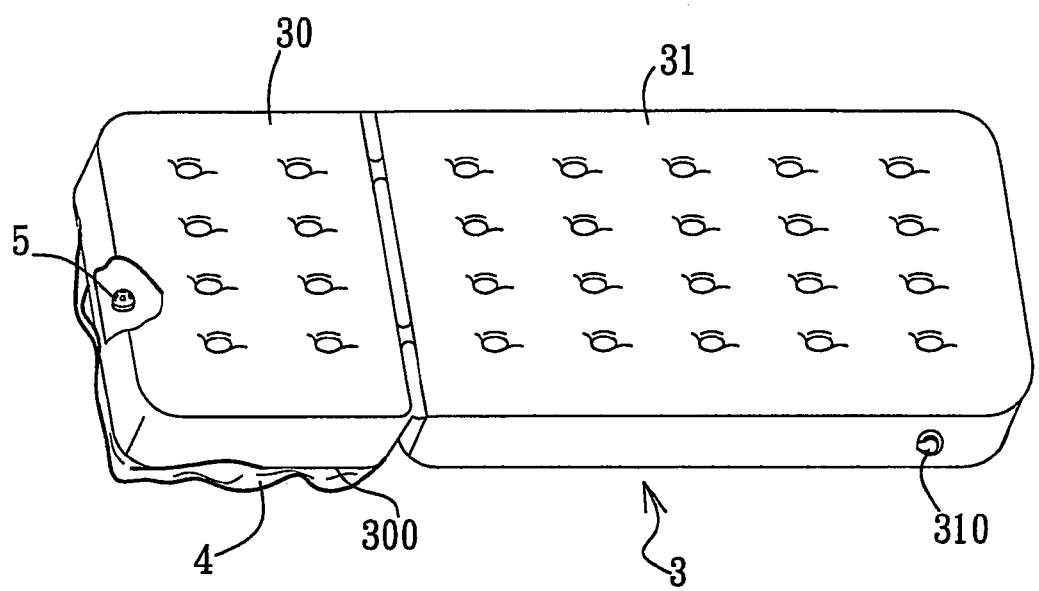
F I G. 2
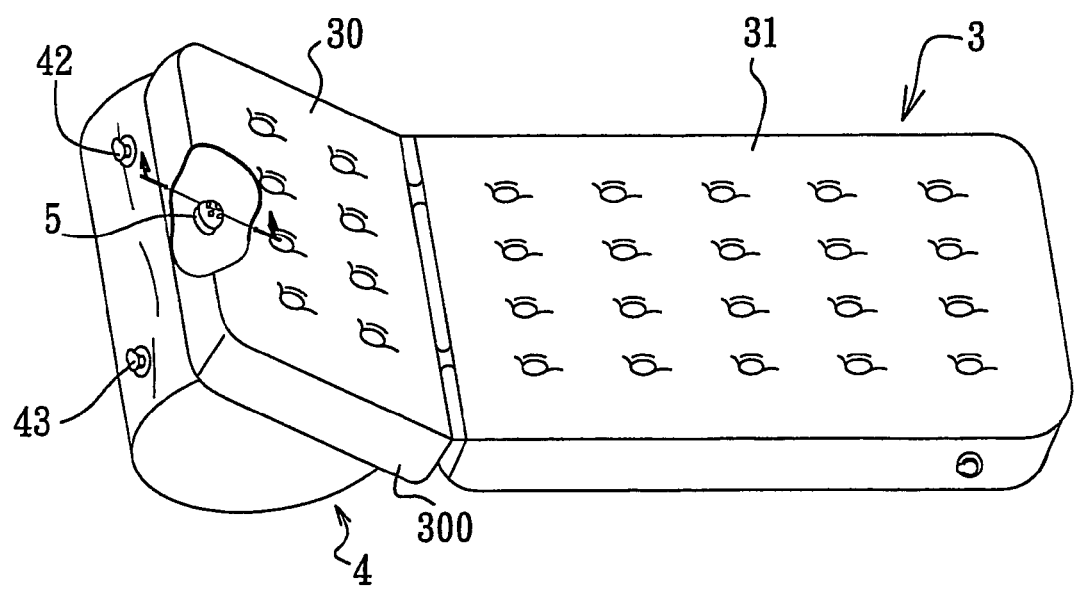
F I G. 3

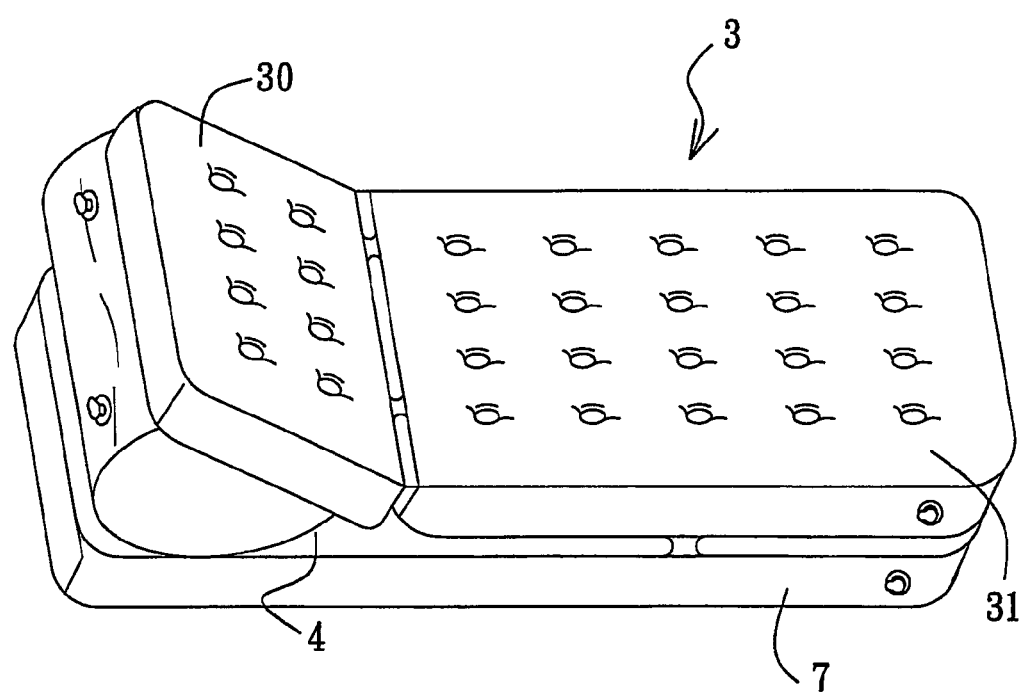
F I G. 7

INFLATABLE BED UNIT

BACKGROUND OF THE INVENTION

1. Field of the Invention

This invention relates to an inflatable bed unit, more particularly to an inflatable bed unit with an inflatable primary bed that includes an inflatable main part, an inflatable head part, and an inflatable pillow part with a check valve that permits air flow from the pillow part to the main part when the pressure in the pillow part is greater than that in the head part.

2. Description of the Related Art

FIG. 1 illustrates a conventional inflatable bed that includes a main part 21, a head part 22 pivoted to and in fluid communication with the main part 21, and a pillow part 20 that is disposed below and connected to the head part 22, and that is in fluid communication with the head part 22. The main part 21 is provided with an injection valve 23 for injecting air into the inflatable bed. The head part 22 is provided with a relief valve 24 for relieving the pressure in the inflatable bed. The head part 22 is raised and is pivoted relative to the main part 21 to an inclined angle relative to the main part 21 when the pillow part 20 expands upon injection of air into the inflatable bed. However, since the pillow part 20 is in fluid communication with the main part 21 and the head part 22, adjustment of the angle of the head part 22 relative to the main part 21 by relieving the pressure in the pillow part 20 would reduce the pressure in the main part 21 and the head part 22, which, in turn, results in a decrease in the comfort that the inflatable bed can provide.

SUMMARY OF THE INVENTION

The object of the present invention is to provide an inflatable bed unit with a check valve that is capable of overcoming the aforesaid drawback of the prior art.

According to this invention, an inflatable bed unit comprises an inflatable primary bed that includes: an inflatable main part; an inflatable head part connected to and in fluid communication with the main part, the head part having a bottom end and being pivotable relative to the main part; an inflatable pillow part connected to the bottom end of the head part such that the head part is raised by the pillow part and is pivoted relative to the main part from a horizontal level to an inclined angle relative to the main part when the pillow part expands upon injection of air therein; and a check valve interconnecting the pillow part and the head part and defining a valve opening that is opened to permit air flow from the pillow part to the head part when the pressure in the pillow part is greater than that in the head part, and that is closed to prevent air flow from the head part to the pillow part when the pressure in the head part is greater than that in the pillow part.

BRIEF DESCRIPTION OF THE DRAWINGS

Other features and advantages of the present invention will become apparent in the following detailed description of the preferred embodiments of the invention, with reference to the accompanying drawings, in which:

FIG. 2 is a perspective view of the first preferred embodiment of an inflatable bed unit according to the present invention, illustrating a state where the pressure of a pillow part is deflated;

FIG. 3 is a perspective view of the first preferred embodiment, illustrating a state where the pillow part is inflated;

FIG. 7 is a perspective view of the third preferred embodiment, illustrating a state where the primary bed is stacked above the auxiliary bed.

DETAILED DESCRIPTION OF THE PREFERRED EMBODIMENTS

Figure 1:
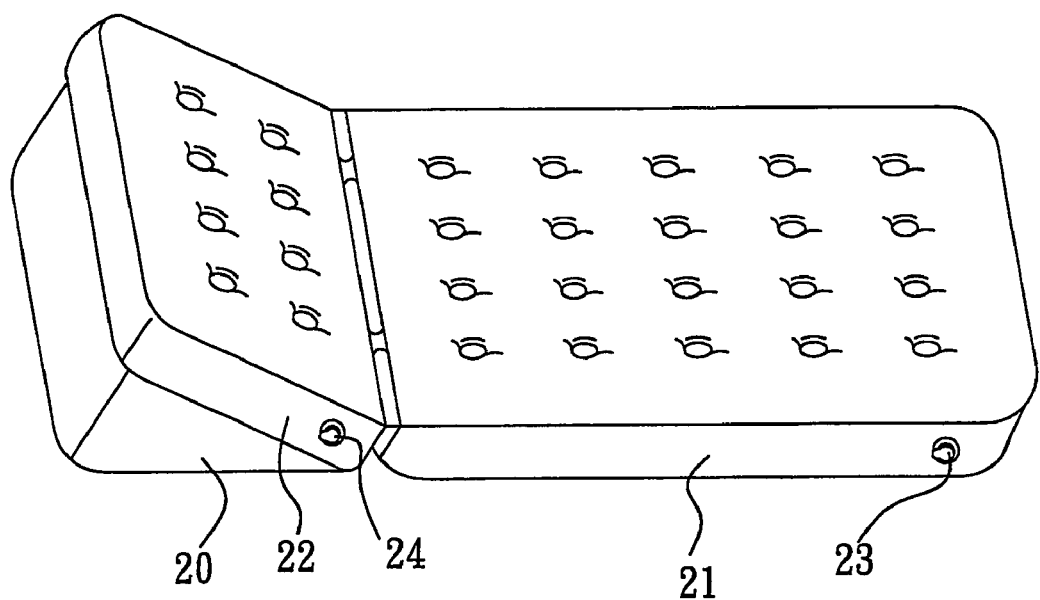
FIG. 1 is a perspective view of a conventional inflatable bed.
Figure 4:
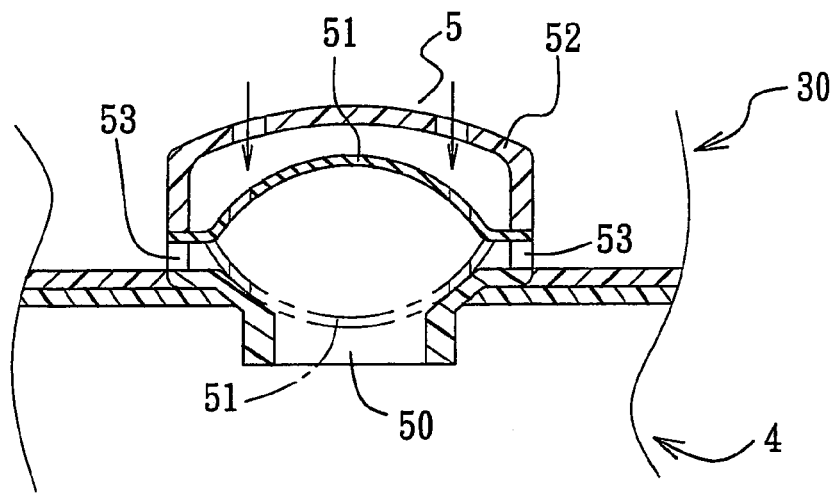
FIG. 4 is a fragmentary sectional view to illustrate how a check valve of the first preferred embodiment functions to permit air flow from the pillow part to a head part.

FIGS. 2 to 4 illustrate the first preferred embodiment of an inflatable bed unit with an inflatable primary bed 3 according to this invention.

The inflatable primary bed 3 includes: an inflatable main part 31; an inflatable head part 30 connected to and in fluid communication with the main part 31, the head part 30 having a bottom end 300 and being pivotable relative to the main part 31; an inflatable pillow part 4 connected to the bottom end 300 of the head part 30 such that the head part 30 is raised by the pillow part 4 and is pivoted relative to the main part 31 from a horizontal level (see FIG. 2) to an inclined angle relative to the main part 31 (see FIG. 3) when the pillow part 4 expands upon injection of air therein; and a check valve 5 interconnecting the pillow part 4 and the head part 30 and defining a valve opening 50 that is opened to permit air flow from the pillow part 4 to the head part 30 when the pressure in the pillow part 4 is greater than that in the head part 30, and that is closed to prevent air flow from the head part 30 to the pillow part 4 when the pressure in the head part 30 is greater than that in the pillow part 4.

In this embodiment, the check valve 5 includes a valve housing 52 that extends into the pillow part 4 and the head part 30 and that is formed with an outlet 53 in fluid communication with the head part 30, and a flexible membrane 51 that serves as a valve piece of the check valve 5, that is flexed away from the valve opening 50 when the pressure in the pillow part 4 is greater than that in the head part 30, thereby opening the valve opening 50, and that is flexed toward the valve opening 50 and that abuts against a periphery of the valve opening 50 when the pressure in the head part 30 is greater than that in the pillow part 4, thereby closing the valve opening 50.

The pillow part 4 includes an injection valve 42 for injecting air into the pillow part 4, and a relief valve 43 for relieving the pressure in the pillow part 4 so that, by virtue of the check valve 5, the inclined angle of the head part 30 relative to the main part 31 can be adjusted independently of the pressure in the head part 30 and the main part 31 through adjustment of the pressure in the pillow part 4, and that the head part 30 can be restored from the inclined angle to the horizontal level relative to the main part 31 when the pressure in the pillow part 4 is completely relieved.

Figure 5:
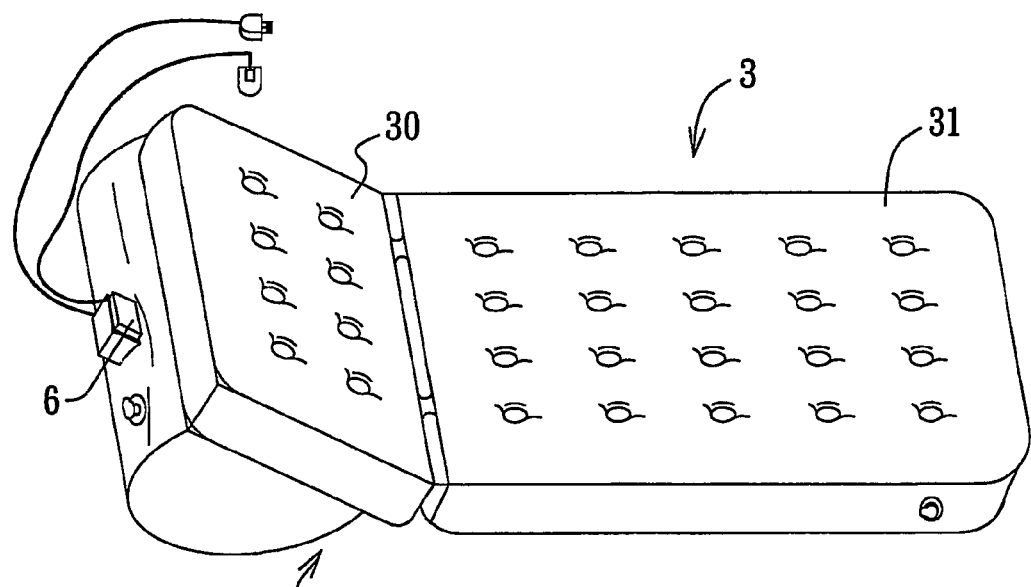
FIG. 5 is a perspective view of the second preferred embodiment of the inflatable bed unit according to the present invention.

FIG. 5 illustrates the second preferred embodiment of the inflatable bed unit according to this invention. The inflatable bed unit of this embodiment is similar to the previous embodiment, except that an electrical air pump 4 is mounted on the pillow part 4 for injecting air into the pillow part 4 when actuated.

Figure 6:
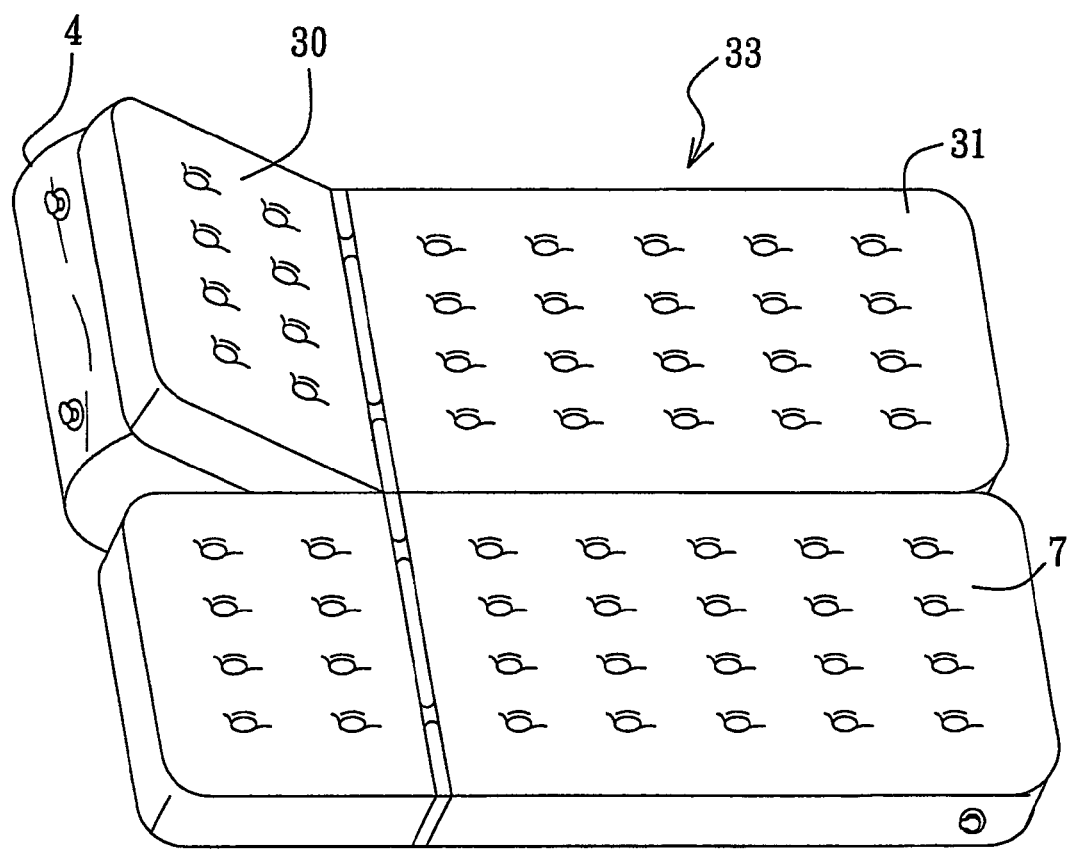
FIG. 6 is a perspective view of the third preferred embodiment of the inflatable bed unit according to the present invention, illustrating a state where an auxiliary bed is juxtaposed with a primary bed.

FIGS. 6 and 7 illustrate the third preferred embodiment of the inflatable bed unit according to this invention. The inflatable bed unit of this embodiment is similar to the first embodiment, except that an auxiliary bed 7 (preferably, the auxiliary bed 7 is inflatable) is connected to the primary, bed 3, and is foldable relative to the primary bed 3 between a horizontally aligned position (see FIG. 6), in which the auxiliary bed 7 is horizontally aligned and is juxtaposed with the primary bed 3, and a vertically aligned position (see FIG. 7), in which the primary bed 3 is stacked above the auxiliary bed 7.

With the inclusion of the check valve 5 in the primary bed 3 of the inflatable bed unit of this invention, the aforesaid drawback associated with the prior art can be eliminated.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. An inflatable bed unit comprising:
   an inflatable primary bed including
   an inflatable main part,
   an inflatable head part connected to and in fluid communication with said main part, said head part having a bottom end and being pivotable relative to said main part,
   an inflatable pillow part connected to said bottom end of said head part such that said head part is raised by said pillow part and is pivoted relative to said main part from a horizontal level to an inclined angle relative to said main part when said pillow part expands upon injection of air therein, and
   a check valve interconnecting said pillow part and said head part and defining a valve opening that is opened to permit air flow from said pillow part to said head part when the pressure in said pillow part is greater than that in said head part, and that is closed to prevent air flow from said head part to said pillow part when the pressure in said head part is greater than that in said pillow part.

2. The inflatable bed unit of claim 1, wherein said check valve includes a flexible membrane that is flexed away from said valve opening when the pressure in said pillow part is greater than that in said head part, thereby opening said valve opening, and that is flexed toward said valve opening and that abuts against a periphery of said valve opening when the pressure in said head part is greater than that in said pillow part, thereby closing said valve opening.

3. The inflatable bed unit of claim 1, wherein said pillow part includes an injection valve for injecting air into said pillow part, and a relief valve for relieving the pressure in said pillow part so that said inclined angle of said head part relative to said main part can be adjusted independently of the pressure in said head part and said main part through adjustment of the pressure in said pillow part and that said head part can be restored from said inclined angle to said horizontal level relative to said main part when the pressure in said pillow part is completely relieved.

4. The inflatable bed unit of claim 1, further comprising an electrical air pump that is mounted on said pillow part for injecting air into said pillow part when actuated.

5. The inflatable bed unit of claim 1, further comprising an auxiliary bed that is connected to said primary bed, and that is foldable relative to said primary bed between a horizontally aligned position, in which said auxiliary bed is horizontally aligned and is juxtaposed with said primary bed, and a vertically aligned position, in which said primary bed is stacked above said auxiliary bed.

* * * * *